Jan. 16, 1968   J. H. THUERMAN ETAL   3,363,745
PIVOTAL CONNECTION FOR LINKS OF FLAT TOP CONVEYOR
Filed Sept. 20, 1966
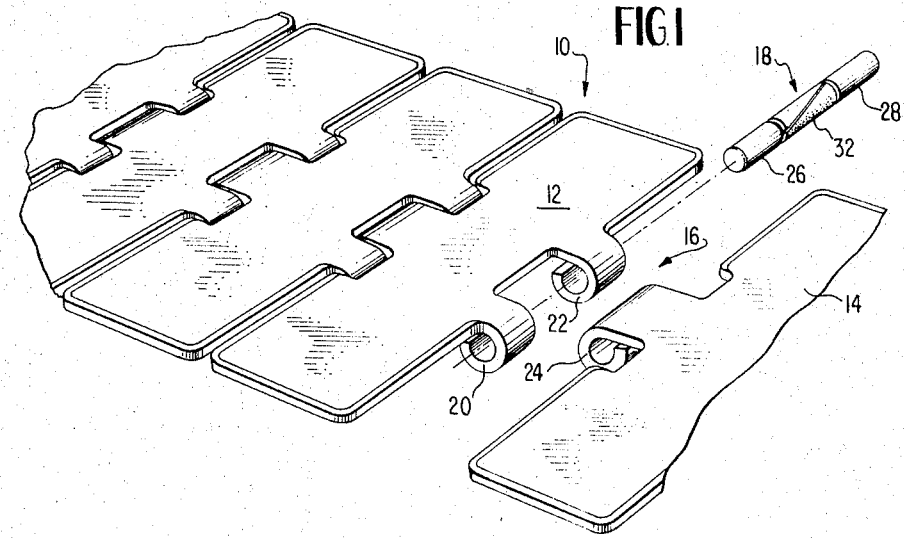
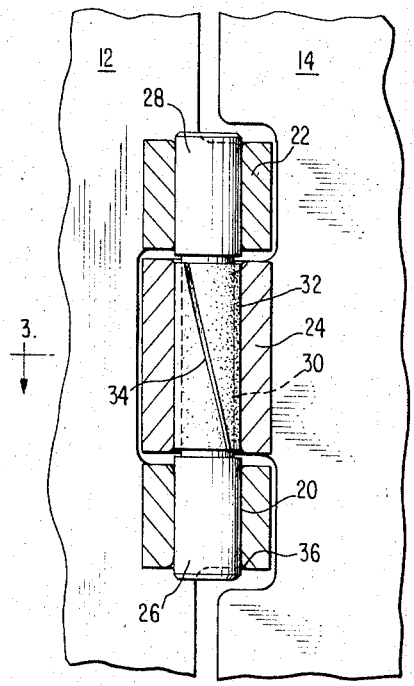
FIG.2
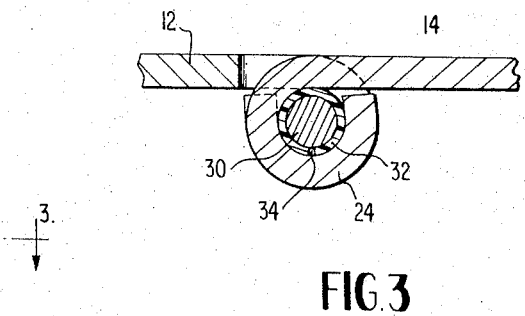
FIG.3
INVENTORS
PHILIP J. IMSE
BY   JOHN H. THUERMAN
Sughrue, Rothwell, Mion, Zinn & Macpeak
ATTORNEYS

3,363,745
PIVOTAL CONNECTION FOR LINKS OF FLAT TOP CONVEYOR
John H. Thuerman, West Allis, and Philip J. Imse, Wauwatosa, Wis., assignors to Rex Chainbelt Inc., Milwaukee, Wis., a corporation of Wisconsin
Filed Sept. 20, 1966, Ser. No. 580,688
5 Claims. (Cl. 198—189)

ABSTRACT OF THE DISCLOSURE

A flat top conveyor link has a pivotal connection at each side edge with an adjacent link. The pivotal connection is formed by interfitting knuckles on the adjacent links, the knuckles having aligned bores for receiving a pin. A resilient deformable sleeve is press fitted within the bore of a central knuckle on one of the links. The pin is secured against rotation in the bores of the knuckles on the adjacent link and is rotatable within the sleeve so that any wear on the pivoting of adjacent links is on the sleeve. The sleeve may be helically split for inserting over the ends of the pin into a reduced diameter portion of the pin and the knuckle eyes may be flared for insertion of the pin in the sleeve.

---

This invention relates to improvements in flat top conveyors and particularly to an improved pivotal connection between adjacent links of the conveyors.

Flat top conveyor chains have long been accepted as one of the best means for conveying bottles, cans, cartons and packages in a wide variety of industries, including the bottling and food processing industries. Typically, such conveyor chains include a plurality of links having smooth top surfaces and interfitting knuckles connected by pins so that adjacent links can pivot with respect to each other on an axis transverse to the conveyor. After long periods of continued use the pins and links both wear around the pivot point, conventionally necessitating replacement of both the pins and the links. This replacement problem caused by wear is further accentuated and is particularly acute in environments where lubrication is prohibited, for example in certain food processing industries.

This invention provides a soluton to this problem by means of a plastic sleeve loosely positioned on an intermediate reduced diameter portion of the pin, the sleeve having an outer diameter to be press fitted into an eye of a kunckle so that the sleeve in effect lines the knuckle eye. Wear will be less since the sleeve is of a low-friction plastic material not requiring lubrication, and this latter factor enables the conveyor to be useful where lubrication is prohibited. Furthermore, when and if wear does occur the wear is on the plastic sleeve which can be quickly and inexpensively replaced.

The foregoing and other objects, features and advantages of the invention will be apparent from the following more particular description of a preferred embodiment of the invention, as illustrated in the accompanying drawings.

In the drawings:

FIGURE 1 is an exploded perspective view of a flat top conveyor chain with the pivotal connection between adjacent links of this invention applied thereto;

FIG. 2 is a plan view partially in section of the pin and knuckle joint constituting the pivotal link between adjacent conveyor sections; and FIG. 3 is a sectional view taken along lines 3—3 of FIG. 2.

Referring to the drawings, a flat top conveyor chain 10 is composed of a plurality of adjacent pivotally connected links such as links 12 and 14 each having flat tops and interfitting knuckles 16. The interfitting knuckles 16 are connected by an interconnecting pin 18 so that the adjacent links 12 and 14 can pivot about the axis of the pin which is transverse to the directional movement of the conveyor. Such flat top conveyors and straight interconnecting pins are known in the art.

On one side of each link are a pair of end eyes such as end eyes 20 and 22 on link 12 while on the other side of each link is an intermediate eye, such as eye 24 shown on link 14. These eyes cooperate to form the interfitting knuckles, and the pin 18 is extended therethrough. In the conventional construction when the pin and links are both of a metal, wear will occur necessitating replacement of both the pin and the links. However, with the construction of this invention the pin 18 includes a pair of end sections 26 and 28 of such a diameter as to enable the pin to be secured within eyes 20 and 22. Intermediate the end sections is a reduced diameter of section 30 on the pin. This reduced diameter section will fit within eye 24. Positioned on the reduced diameter section is a plastic sleeve 32. The plastic sleeve 32 is loosely rotatable on the reduced diameter section 30 and is of such a thickness that when the pin is inserted, the sleeve 32 is press fit within knuckle eye 24. The plastic sleeve 32 preferably includes a longitudinal helical split 34 so that it may be placed on and removed from pin 18 as required. The ends of one eye such as eye 20 are flared as at flare 36 in order to enable the pin 18 with sleeve 32 thereon to be placed in the knuckle.

The operation of the invention is as follows: The pin 18 is inserted through eyes 20, 24 and 22 of the interfitting knuckles 16 with the end sections 26 and 28 of the pin secured within eyes 20 and 22 and the intermediate section 30 of the pin 18 carrying plastic sleeve 32 which also has a press fit inside of intermediate eye 24 due to its outside diameter. The sleeve 32 then provides a bearing for the intermediate section 30 so that the pin can rotate therein. Thus when link 12 pivots with regard to link 14 about the axis of pin 18, sleeve 32 constitutes a bearing, in effect lining eye 24 for the reduced diameter section 30 of pin 18 contacting the inside of sleeve 32. The sleeve is of a low friction plastic material such as nylon, Delrin, or Teflon which will not require lubrication so that the device can be used in various industries such as food processing where lubrication is prohibited. Furthermore, if after extensive use wear occurs the wear will occur on the moving surfaces between reduced diameter portion 30 of pin 18 and sleeve 32. Since sleeve 32 is the softer of the two materials, it will usually wear the most and when the wear becomes so great that the pin 18 needs to be replaced, all that is necessary is to drive out connecting pin 18 and sleeve 32 carried thereby and to replace the sleeve or pin or both.

While the invention has been particularly shown and described with reference to a preferred embodiment thereof, it will be understood by those skilled in the art that various changes in form and details may be made therein without departing from the spirit and scope of the invention.

We claim:

1. In a chain comprising adjacent links having opposing edges and having interfitting knuckles disposed on said opposing edges provided with aligned bores of approximately the same inner diameter, a resilient deformable sleeve of low friction material fitted and secured against rotation in each bore disposed on one of said opposing edges and a pin fitted and secured against rotation in each bore on the other of said opposing edges and having a reduced diameter portion corresponding to and rotatable in each sleeve.

2. The invention of claim 1 wherein each sleeve is longitudinally helically split for assembly on the pin.

3. A chain comprising adjacent links having interfitting knuckles provided with aligned bores of approximately the same inner diameter and a connecting pin insertable endwise in said bores, the improvement comprising said pin having at least one reduced diameter portion adjacent at least one relatively large diameter portion, a resilient deformable sleeve of low friction material assembled on and rotatable relative to each reduced diameter portion of said pin whereby said pin and each sleeve are insertable as a unit endwise of said bores, each relatively large diameter portion and each sleeve being tightly and non-rotatably disposed in the bores of said interfitting knuckles in the assembled condition.

4. In a chain including two adjacent links having interfitting knuckles provided with aligned eyes of substantially the same inner diameter and an interconnecting pin having its end sections secured from rotation in the eyes of the end knuckle of one of the links, said pin having a reduced diameter section intermediate its end sections and having a resilient plastic sleeve of low friction material freely turnable on the intermediate section and secured endwise by the end sections of the pin, the eyes of at least one end knuckle having flared ends for insertion of the pin and bushing endwise therethrough for positioning in the aligned eyes of the interfitting knuckles, said sleeve being adapted to be elastically deformed in passing through said eye having flared ends and having a normal outside diameter so as to fit tightly within the bore of the intermediate knuckle and to provide a low friction bearing for the pin.

5. In a flat top conveyor chain, including two adjacent links having interfitting knuckles provided with eyes of substantially the same inner diameter and an interconnecting pin having its end sections secured from rotation in the eyes of the end knuckles of one of the links, the improvements comprising; a reduced diameter section intermediate the ends of the pin, a resilient plastic sleeve of low-friction material freely turnable on the intermediate section and prevented from endwise movement by the larger diameter ends of the pin, the outer diameter of the sleeve being related to the inner diameter of the intermediate knuckle so as to fit tightly within and be secured against rotation, so that the pivotal connection of adjacent links will cause frictional contact only between the reduced diameter portion of the pin and the inside diameter of the resilient plastic sleeve.

References Cited
UNITED STATES PATENTS

| | | | |
|---|---|---|---|
| 2,115,994 | 5/1938 | Lamb | 74—251 |
| 2,385,923 | 10/1945 | Klaucke et al. | 198—189 |
| 2,570,942 | 10/1951 | Hadfield | 16—168 |
| 2,660,292 | 11/1953 | Chessman | 198—189 |
| 2,816,453 | 12/1957 | Frank et al. | 198—189 |
| 2,835,540 | 5/1958 | Jorgensen | 308—238 |
| 2,911,091 | 11/1959 | Imse | 198—189 |

FOREIGN PATENTS

| | | |
|---|---|---|
| 919,614 | 2/1963 | Great Britain. |

EVON C. BLUNK, *Primary Examiner.*

M. L. AJEMAN, *Assistant Examiner.*